US009949186B2

(12) United States Patent
Cariou et al.

(10) Patent No.: US 9,949,186 B2
(45) Date of Patent: Apr. 17, 2018

(54) RESOURCE BLOCK IDENTIFICATIONS (RBIDS) FOR NEIGHBOR STATION RESOURCE REQUESTS

(71) Applicant: Intel IP Corporation, Santa Clara, CA (US)

(72) Inventors: Laurent Cariou, Portland, OR (US); Chittabrata Ghosh, Fremont, CA (US); Yaron Alpert, Hod Hasharoni (IL)

(73) Assignee: Intel IP Corporation, Santa Clara, CA (US)

( * ) Notice: Subject to any disclaimer, the term of this patent is extended or adjusted under 35 U.S.C. 154(b) by 202 days.

(21) Appl. No.: 15/080,808

(22) Filed: Mar. 25, 2016

(65) Prior Publication Data

US 2017/0070930 A1   Mar. 9, 2017

Related U.S. Application Data

(60) Provisional application No. 62/214,405, filed on Sep. 4, 2015, provisional application No. 62/221,725, filed
(Continued)

(51) Int. Cl.
*H04W 36/08* (2009.01)
*H04B 7/0452* (2017.01)
(Continued)

(52) U.S. Cl.
CPC .......... *H04W 36/08* (2013.01); *H04B 7/0413* (2013.01); *H04B 7/0452* (2013.01);
(Continued)

(58) Field of Classification Search
None
See application file for complete search history.

(56) References Cited

U.S. PATENT DOCUMENTS

2006/0227731 A1* 10/2006 Shun ................... H04W 36/18
370/310
2006/0227745 A1* 10/2006 Olvera-Hernandez ............ H04W 36/32
370/331
(Continued)

FOREIGN PATENT DOCUMENTS

WO   WO-2017040067 A1   3/2017

OTHER PUBLICATIONS

"International Application Serial No. PCT/US2016/047771, International Search Report dated Nov. 22, 2016", 5 pgs.
(Continued)

*Primary Examiner* — Andrew Lai
*Assistant Examiner* — Jamaal Henson
(74) *Attorney, Agent, or Firm* — Schwegman Lundberg & Woessner, P.A.

(57) ABSTRACT

Computer readable media, methods, and apparatus for resource block identification (RBIDs) for neighbor station resource requests are disclosed. An apparatus of a station is disclosed. The apparatus may include a memory, and processing circuitry coupled to the memory. The processing circuitry may be configured to decode a neighbor report comprising one or more RBIDs from a first access point. Each RBID may indicate a frequency resource allocation to transmit one bit of information to a second access point. The processing circuitry may be further configured to respond to decoding a poll trigger from the second access point, by encoding a response to the poll trigger in accordance with the corresponding frequency resource allocation indicated by one of the one or more RBIDs. The processing circuitry may be further configured to configure the station to transmit the response to the second access point in accordance orthogonal frequency division multiple access (OFDMA).

25 Claims, 9 Drawing Sheets

Related U.S. Application Data on Sep. 22, 2015, provisional application No. 62/221,712, filed on Sep. 22, 2015.

(51) Int. Cl.

| | | |
|---|---|---|
| *H04L 5/00* | (2006.01) | |
| *H04W 36/24* | (2009.01) | |
| *H04W 52/02* | (2009.01) | |
| *H04W 72/04* | (2009.01) | |
| *H04B 7/0413* | (2017.01) | |
| *H04W 84/12* | (2009.01) | |

(52) U.S. Cl.
CPC .......... *H04L 5/0007* (2013.01); *H04W 36/24* (2013.01); *H04W 52/0206* (2013.01); *H04W 72/0453* (2013.01); *H04W 84/12* (2013.01); *Y02B 60/50* (2013.01)

(56) References Cited

U.S. PATENT DOCUMENTS

| | | | | |
|---|---|---|---|---|
| 2006/0268756 | A1* | 11/2006 | Wang | H04W 36/32 370/310 |
| 2010/0165907 | A1* | 7/2010 | Chu | H04L 12/1868 370/312 |
| 2013/0286959 | A1 | 10/2013 | Lou et al. | |
| 2014/0269544 | A1 | 9/2014 | Zhu et al. | |
| 2015/0146654 | A1* | 5/2015 | Chu | H04W 72/1289 370/329 |
| 2015/0146807 | A1* | 5/2015 | Zhang | H04L 5/0007 375/260 |
| 2016/0105304 | A1* | 4/2016 | Kwon | H04L 27/2665 370/338 |

OTHER PUBLICATIONS

"International Application Serial No. PCT/US2016/047771, Written Opinion dated Nov. 22, 2016", 7 pgs.

"UL MU Procedure", IEEE 802.11-15/0365r0, LG Electronics, (Mar. 9, 2015), 16 pgs.

Chittabrata, Ghosh, et al., "Random Access with Trigger Frames using OFDMA", IEEE 802.11-15/0875r1, (Jul. 14, 2015), 16 pgs.

Yonggang, Fang, et al., "UL MU Random Access Analysis", IEEE 802.11-15/0843r1, (Jul. 15, 2015), 20 pgs.

* cited by examiner

RESOURCE BLOCK IDENTIFICATIONS (RBIDS) FOR NEIGHBOR STATION RESOURCE REQUESTS

PRIORITY CLAIM

This application claims the benefit of priority under 35 USC 119(e) to U.S. Provisional Patent Application Ser. No. 62/214,405, filed Sep. 4, 2015, U.S. Provisional Patent Application Ser. No. 62/221,725, filed Sep. 22, 2015, and U.S. Provisional Patent Application Ser. No. 62/221,712, filed Sep. 22, 2015, each of which is incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the Institute of Electrical and Electronic Engineers (IEEE) 802.11 family of standards. Some embodiments relate to IEEE 802.11ax. Some embodiments relate to resource block identifications (RBIDs) for neighbor stations resource requests.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
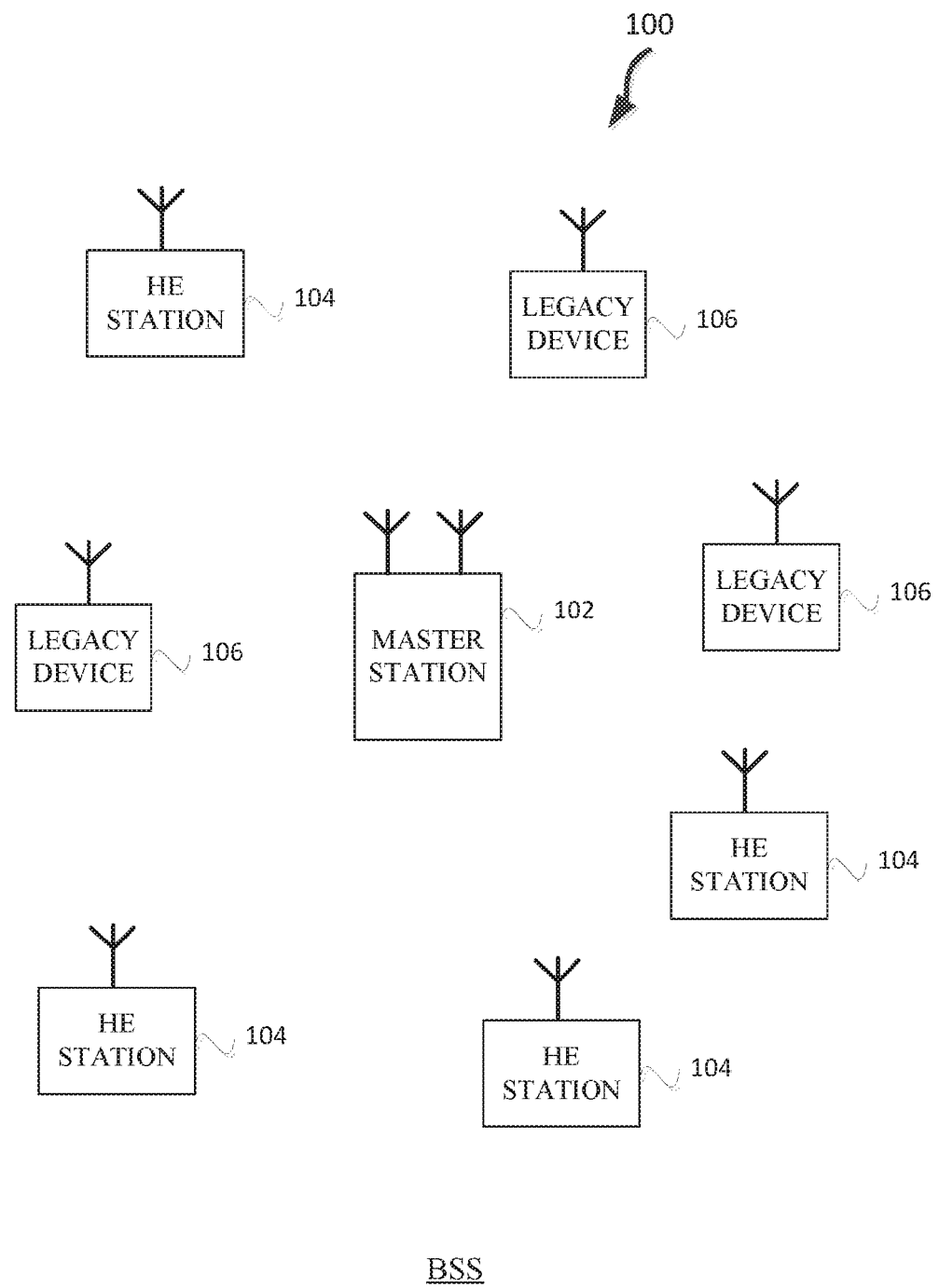
FIG. 1 illustrates a wireless network in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency (HE) (e.g., IEEE 802.1 lax) stations (STA)s 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.1 lax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11 a/b/g/n/ac/ad/af/ah/aj/ay, or another legacy wireless communication standard. The legacy devices 106 may be STAs or IEEE STAs. The HE STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.1 lax or another wireless protocol. In some embodiments, the HE STAs 104 may be termed high efficiency (HE) stations.

The master station 102 may communicate with legacy devices 106 in accordance with legacy IEEE 802.11 communication techniques. In example embodiments, the master station 102 may also be configured to communicate with HE STAs 104 in accordance with legacy IEEE 802.11 communication techniques.

In some embodiments, a HE frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HE frame may be configured for transmitting a number of spatial streams, which may be in accordance with MU-MIMO. In other embodiments, the master station 102, HE STA 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (Wi-MAX)), BlueTooth®, or other technologies.

Some embodiments relate to HE communications. In accordance with some IEEE 802.1 lax embodiments, a master station 102 may operate as a master station which may be arranged to contend for a wireless medium (e.g., during a contention period) to receive exclusive control of the medium for an HE control period. In some embodiments, the HE control period may be termed a transmission opportunity (TXOP). The master station 102 may transmit a HE master-sync transmission, which may be a trigger frame or HE control and schedule transmission, at the beginning of the HE control period. The master station 102 may transmit a time duration of the TXOP and sub-channel information. During the HE control period, HE STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HE control period, the master station 102 may communicate with HE stations 104 using one or more HE frames. During the HE control period, the HE STAs 104 may operate on a sub-channel smaller than the operating range of the master station 102. During the HE control period, legacy stations refrain from communicating.

In accordance with some embodiments, during the master-sync transmission the HE STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HE control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HE stations 104 in accordance with legacy IEEE 802.11 communication techniques. In some embodiments, the master station 102 may also be configurable to communicate with HE stations 104 outside the HE control period in accordance with legacy IEEE 802.11 communication techniques, although this is not a requirement.

In example embodiments, the HE device 104 and/or the master station 102 are configured to perform the methods and functions herein described in conjunction with FIGS. 1-9.

Figure 2:
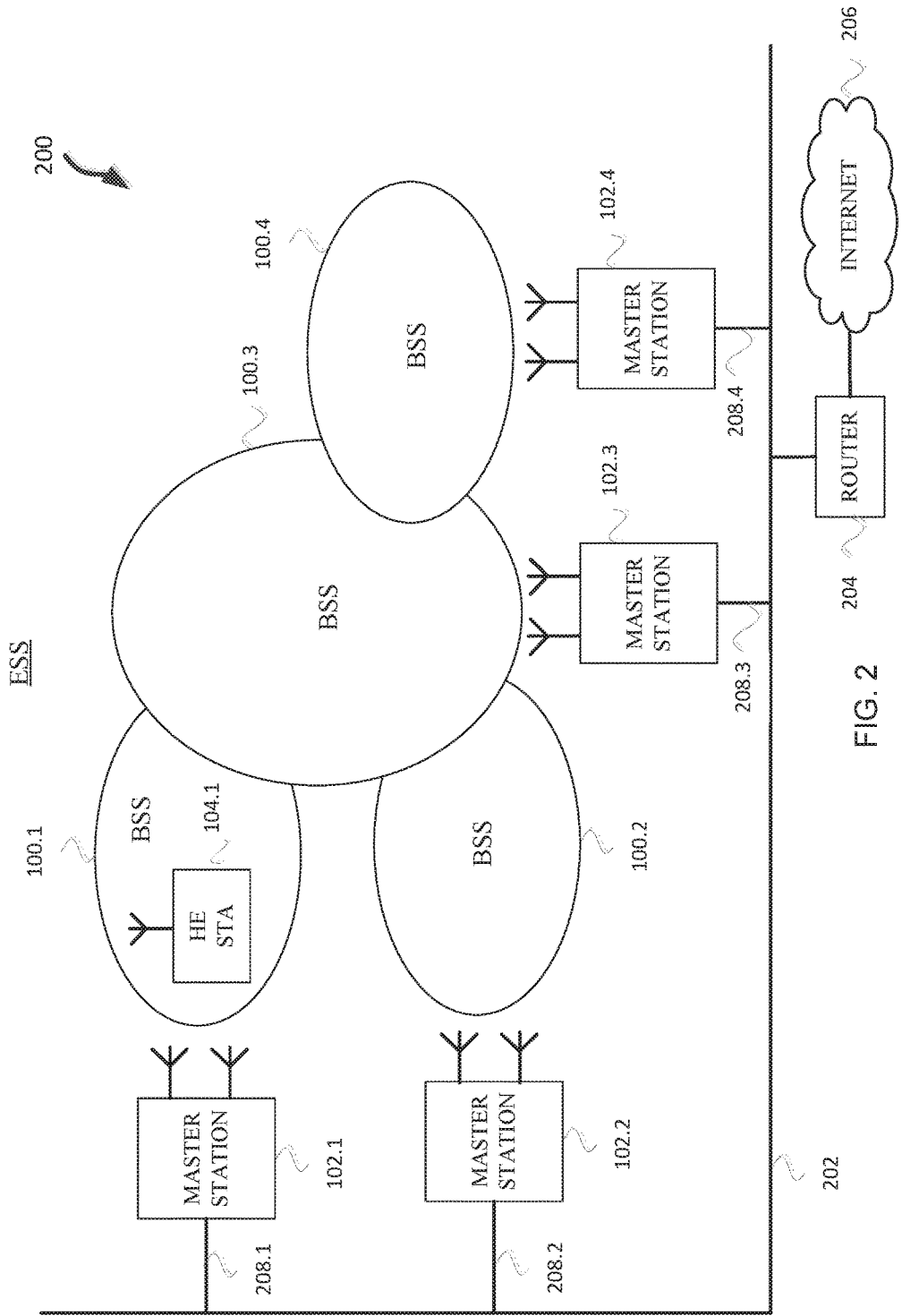
FIG. 2 illustrates an extended service set (ESS) in accordance with some embodiments.

FIG. 2 illustrates an extended service set (ESS) 200 in accordance with some embodiments. Illustrated in FIG. 2 are master stations 102, BSSs 100, backbone 202, router 204, Internet 206, station 104, and communication links 208. The ESS 200 comprises four BSSs 100.1, 100.2, 100.3, and 100.4. The master stations 102.1, 102.2, 102.3, and 102.4 are part of their respective BSS 100.1, 100.2, 100.3, and 100.4.

The master stations 102 are coupled to a backbone 202 through a communication links 208. The backbone 202 may be any technology that provides the appropriate services to the ESS 200. For example, the backbone 202 may be Ethernet cables or wireless. The communication links 208 may be cables or wireless links. The router 204 may be router 204 that routes 204 packets based on destination addresses. The Internet 206 may be the Internet. All the master stations 102.1, 102.2, 102.3, and 102.4 are given the same service set identifier (SSID). As illustrated BSS 100.3 overlaps with BSS 100.1, 100.2, and 100.4. In accordance with some embodiments, master stations 102 that are part of the same ESS 200 may be termed neighbor access points or master stations 102 to other access points or master stations 102 of the same ESS 200. For example, master station 102.1 is a neighbor access point or master station 102.1 to master stations 102.2, 102.3, and 102.4. Master stations 102 may send information regarding the master station 102 and BSS 100 to neighbor master stations 102. The master stations 102 may be configured to operate on different primary channels.

The master stations 102 may generate a table that allocates RBIDs for neighboring HE stations 316 (see FIG. 3) associated with neighboring master stations 102. The RBIDs for neighboring HE stations 316 may allocate a range of RBIDs for HE stations 316 to randomly select an RBID from the range or the RBIDs for neighboring HE stations 316 may allocate one or more specific RBIDs for an HE station 316. The RBIDs of the RBIDs for neighboring HE stations 316 may be RBIDs for the HE stations 104 to use to respond to polls from the neighboring master station 102.3.

Figure 3:
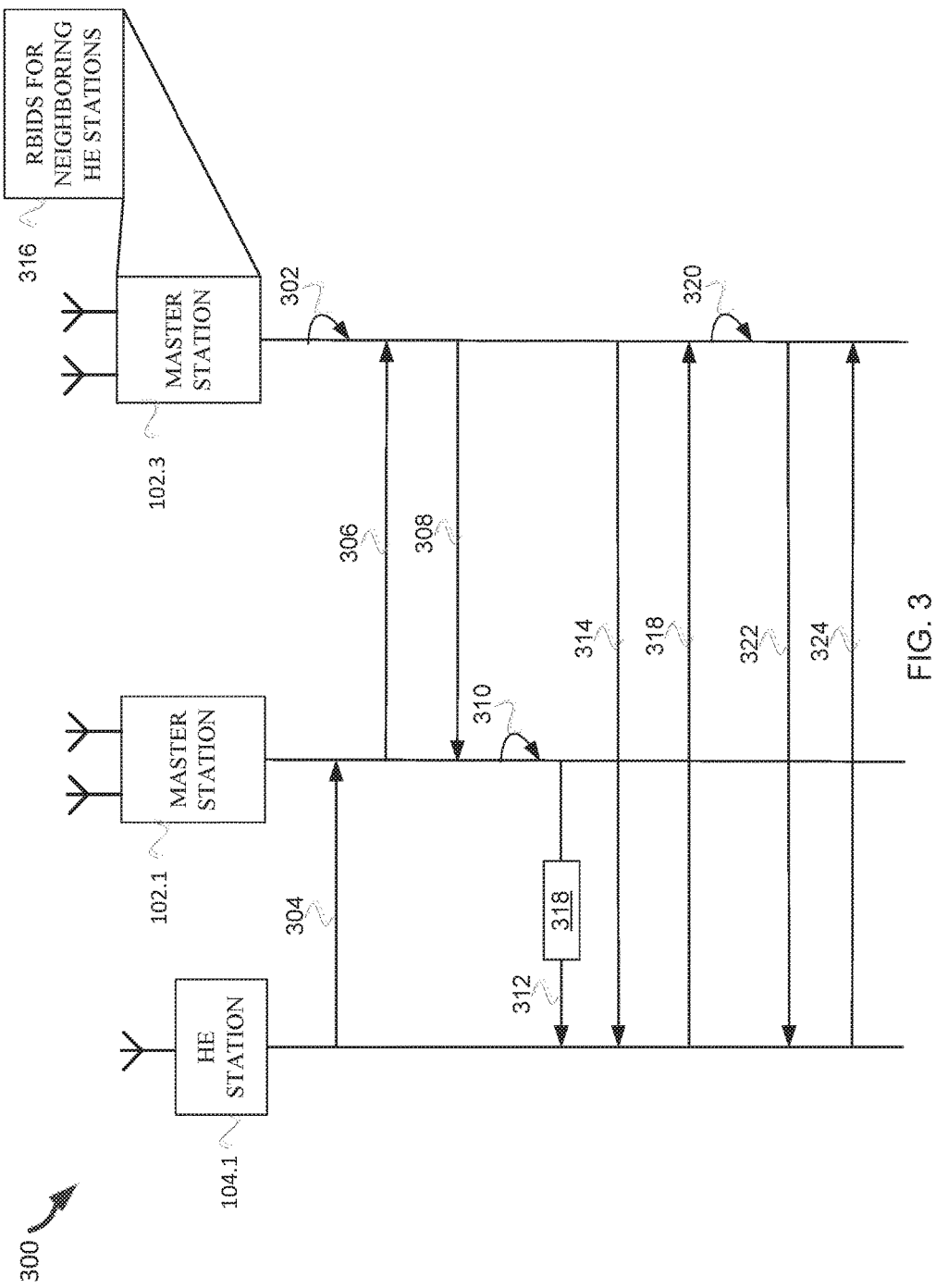
FIG. 3 illustrates a method of transmitting a neighbor report including RBID information to a HE station in accordance with some embodiments.

FIG. 3 illustrates a method of transmitting a neighbor report 318 including RBID information to a HE station 104 in accordance with some embodiments. Illustrated in FIG. 3 is a HE station 104.1, a master station 102.1, and master station 102.3. The HE station 104.1 may be a HE station 104 that is associated with master station 102.1. For example, master station 102.1 may be part of ESS 200 (FIG. 2) and BSS 100.1. HE station 104.1 may be associated with master station 102.1. Master station 102.3 may be part of BSS 100.3, which is a neighbor of master station 102.1.

The method 300 may begin at operation 302 with the master station 102.3 generating RBIDs for neighboring HE stations 316. The RBIDs for neighboring HE stations 316 may be a range of RBIDs for neighboring HE stations 316 to use or may be an assignment of one or more RBIDs for particular neighboring HE stations 104.1, which may be based on association identification (AIDs) of the HE stations 104.1.

The method 300 continues at operation 304 with HE station 104.1 transmitting a neighbor report request to master station 102.1. The neighbor report request may be a request probe that indicates the HE station 104.1 would like a neighbor report 318. In some embodiments, the HE station 104.1 does not transmit the neighbor report request to the master station 102.1. The master station 102.1 may transmit the neighbor report 318 to the HE station 104.1 without the HE station 104.1 requesting the neighbor report 318. For example, the master station 102.1 may determine that HE station 104.1 must or should associate with master station 102.3 and transmit the neighbor report 318 to assist the HE station 104.1 to associate with master station 102.3.

The method 300 may continue at operation 306 where the master station 102.1 may send a request for the RBIDs for neighboring HE stations 316. In some embodiments, the master station 102.1 does not send the request for the RBIDs for neighboring HE stations 316. The request may include a specific AID of a HE station 104.1 that is associated with the master station 102.1.

The method 300 may continue at operation 308 where the master station 102.3 sends the RBIDs for neighboring HE stations 316 to master station 102.1. The master station 102.3 may send the RBID for neighboring HE stations 316 via the backbone 202. The master station 102.3 may send only a portion of the RBIDs for neighboring HE stations 316. For example, master station 102.1 may only request the RBIDs that are allocated for HE station 104.1.

The method 300 may continue at operation 310 with master station 102.1 determining a neighbor report 318, which may include all of or a portion of the RBIDs for neighboring HE stations 316. The neighbor report 318 may be the same or similar as the neighbor reports 400, 500 disclosed in conjunction with FIGS. 4 and 5. The neighbor report 318 may include information about known access point neighbors that may have services available to the HE station 104.1.

The method 300 may continue at operation 312 with master station 102.1 transmitting the neighbor report 318 to the HE station 104.1. In some embodiments, the method 300 may continue at operation 314 with master station 102.3 transmitting a poll packet. For example, master station 102.3 may transmit an UL OFDMA short resource request packet. In some embodiments, the master station 102.3 may transmit a poll trigger.

In some embodiments, the master station 102.3 may transmit a packet that indicates that HE stations 104 should use one or more resource allocations indicated by an RBID 620 (see FIG. 6) to indicate that the HE station 104 is requesting an UL resource allocation to transmit a packet to the master station 102.3. For example, HE station 104.1 may be associated with master station 102.1 and the HE station 104.1 may want to send a probe for more information regarding the services offered by master station 102.3 or may want to send an association request to master station 102.3. The resource allocation indicated by the RBID 620 is only for a single bit of information in accordance with some embodiments.

The master station 102.3 may determine whether energy was transmitted on the resource allocation. The meaning of energy transmitting on the resource allocation may vary in accordance with a communication standard. For example, energy on the resource allocation may indicate that the HE station 104.1 wants a resource allocation to transmit in the UL to the master station 102.3. When a range of RBIDs is indicated in the neighbor report 318 the master station 102.3 may only be able to tell that an unassociated HE station 104.1 has signaled. The master station 102.3 may then schedule or obtain the wireless medium to respond to or met the requested resources of the unassociated HE station 104.1.

The method 300 may continue at operation 318 with the HE station 104.1 transmitting a response to the packet transmitted at operation 314 using a resource allocation indicated by the one or more RBIDs indicated in the neighbor report 318. The neighbor report 318 may include a subfield that indicates when the master station 102.3 is to transmit at operation 314. For example, neighbor AP T-TFRR-TT offset 426 (FIGS. 4 and 5) may indicate the next time when the UL OFDMA short resource request packet is transmitted by the master station 102.3.

The method 300 may continue at operation 320 with the master station 102.3 determining resource allocation based at least partially on the response 318. There may be other responses 318 from other stations 104 as well.

The method 300 may continue at operation 322 with the master station 102.3 transmitted a resource allocation. E.g., the master station 102.3 may transmit a trigger frame for UL transmission where the AID of HE station 104.1 indicates an UL resource allocation for HE station 104.1. The method 300 may continue at operation 324 with the HE station 104.1 transmitting to the master station 102.3 in accordance with the resource allocation transmitted at operation 322. Operations 304, 306, 314, 318, 320, 322, and/or 324 may be optional in some embodiments.

Figure 4:
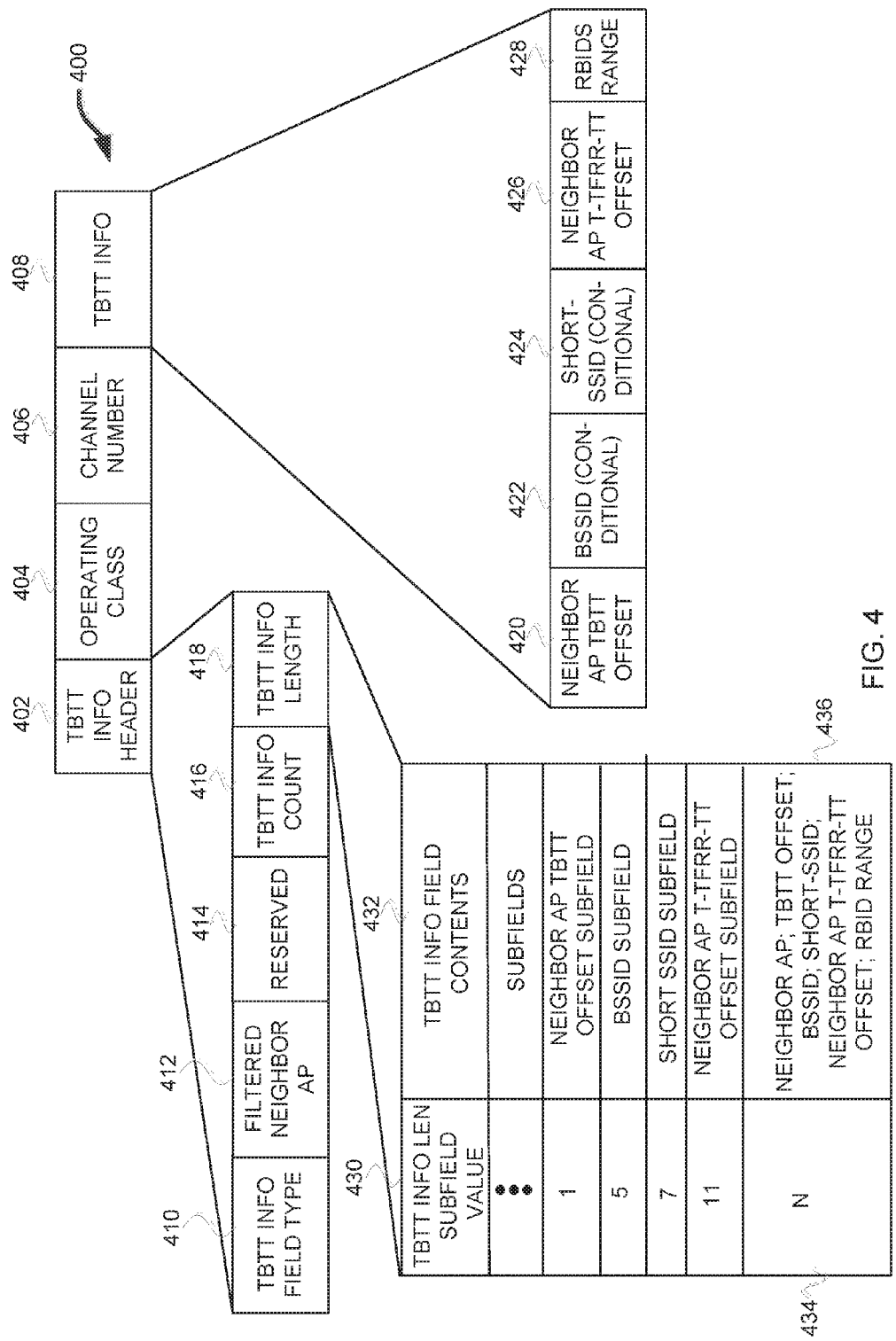
FIG. 4 illustrates a neighbor report in accordance with some embodiments.

FIG. 4 illustrates a neighbor report 400 in accordance with some embodiments. Illustrated in FIG. 4 are the target beacon transmission time (TBTT) information header 402, operating class 404, channel number 406, and TBTT information 408.

The TBTT information header 402 may comprise TBTT information field type 410, filtered neighbor AP 412, reserved 414, TBTT information count 416, and TBTT information length 418.

The TBTT information length 418 includes a TBTT information length subfield value 430 which indicates the TBTT information field contents 432. For example, TBTT information 408 is neighbor AP TBTT offset subfield if the value of TBTT information length subfield value is 1. There may be TBTT information length subfield values 434 to indicate that the TBTT information 408 is one of the following: neighbor AP, TBTT offset, BSSID, short-SSID, neighbor AP T-TFRR-TT offset, and RBID range.

The TBTT information 408 may include neighbor AP TBTT offset 420, BSSID (conditional) 422, short-SSID (conditional) 424, neighbor AP T-TFRR-TT offset 426, and RBIDs range 428.

The RBIDs range 428 may be a range of RBIDs 428 that may be used by the HE station 104 to respond to a neighbor AP. For example, the neighbor AP may transmit an UL short resource request and the HE station 104 may select an RBID from the RBID range 428 and respond using the selected RBID. The response on the selected RBID may indicate the HE station 104 would like UL resources to transmit to the neighbor AP.

Figure 5:
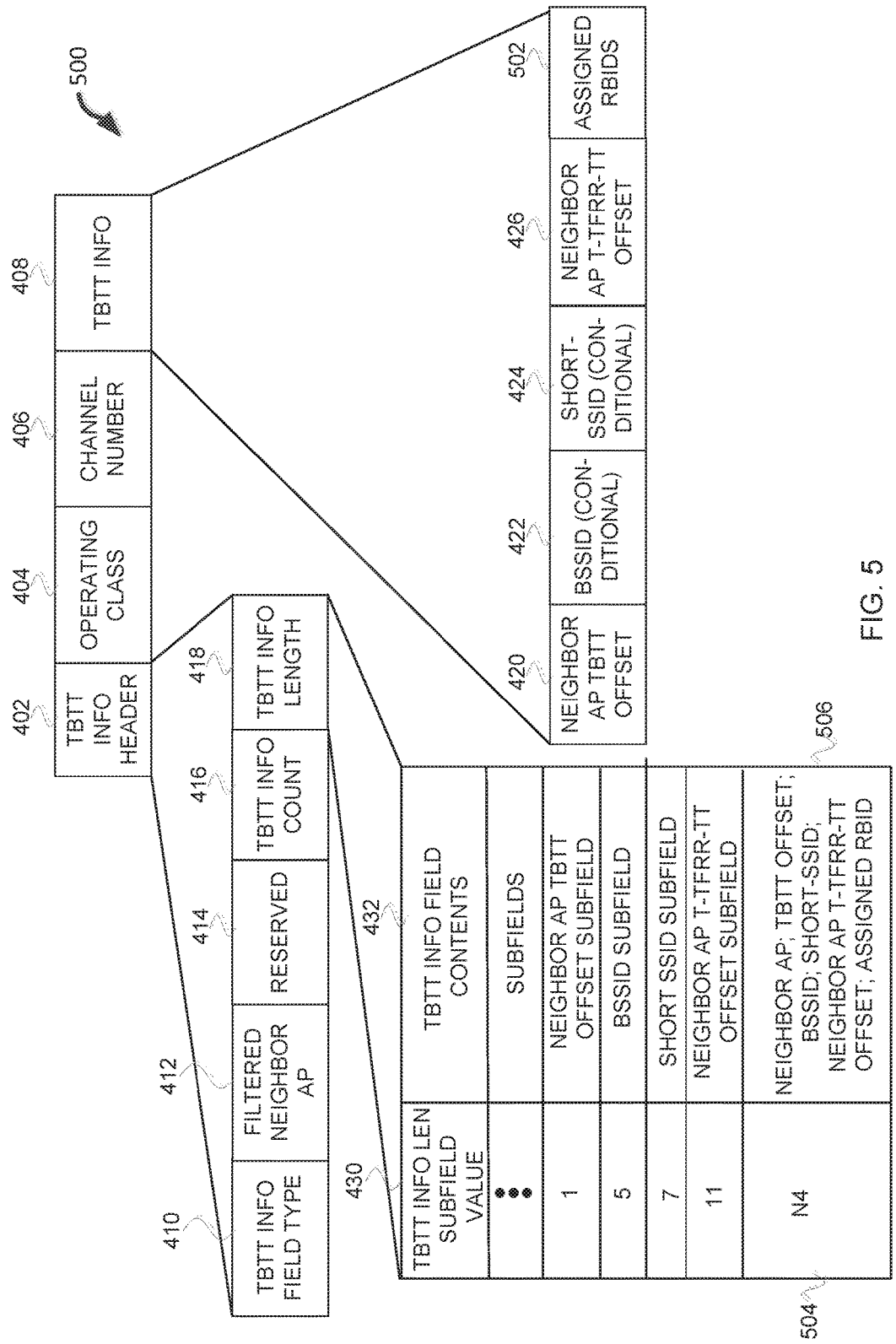
FIG. 5 illustrates a neighbor report in accordance with some embodiments.

FIG. 5 illustrates a neighbor report 500 in accordance with some embodiments. Illustrated in FIG. 5 is assigned RBIDS 502, TBTT information length subfield value 504, TBTT information field contents 432 with contents 506 of one neighbor AP including neighbor AP, TBTT offset, BSSID, short-SSID, neighbor AP T-TFRR-TT offset, and assigned RBID. In some embodiments a value of 15 for TBTT information length subfield value 430 may indicate that TBTT information 408 is assigned RBID. The assigned RBIDs 502 may be one or more RBIDs that are assigned to a HE station 104. The assignment may be based on an AID of the HE station 104.

Figure 6:
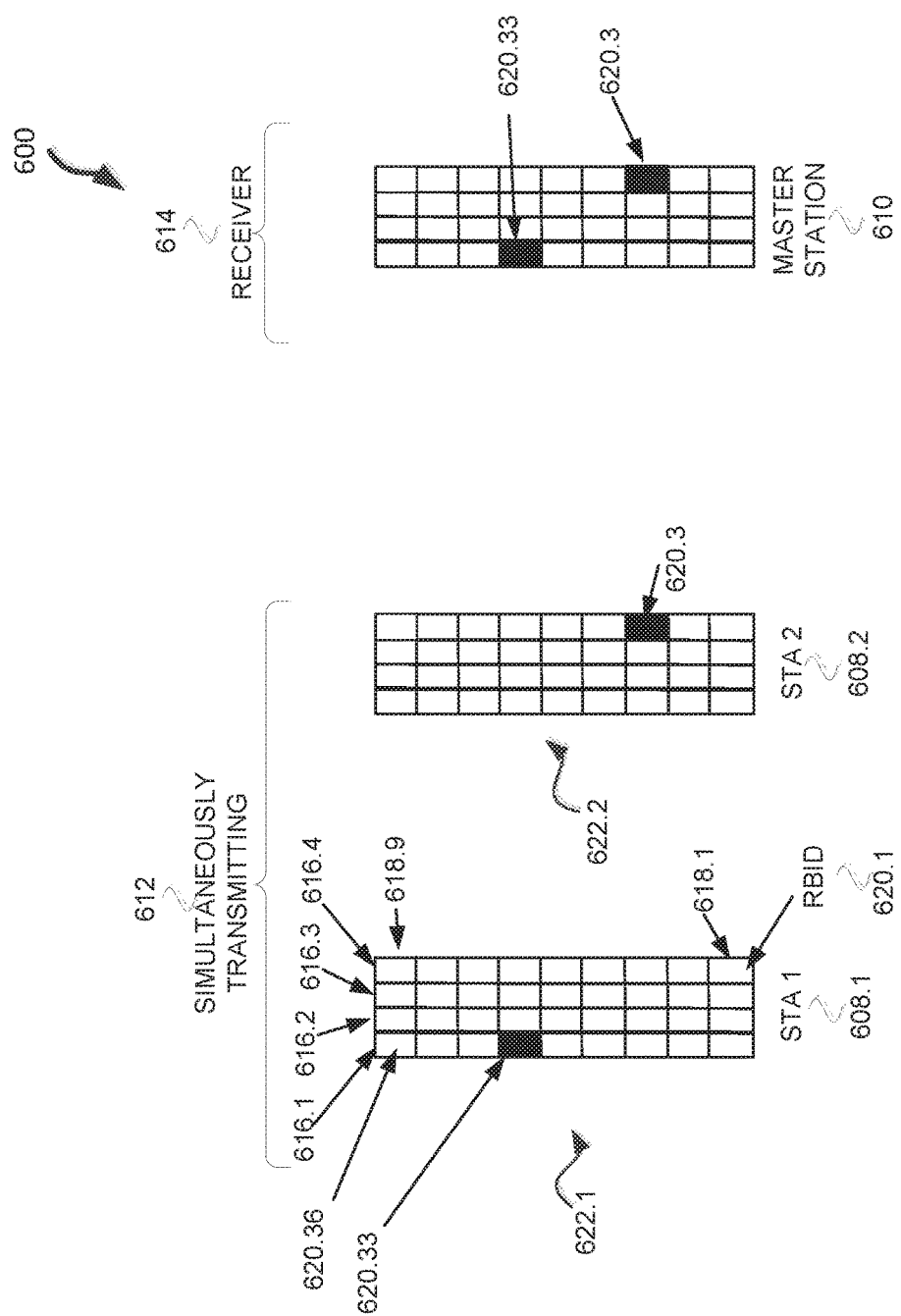
FIG. 6 illustrates an example of stations transmitting using RBIDs to a master station in accordance with some embodiments.

FIG. 6 illustrates an example 600 of stations transmitting using RBIDs to a master station in accordance with some embodiments. Illustrated in FIG. 6 is a simultaneous transmission 612 of STA 1 608.1 and STA 2 608.2 that is received by receiver 614 master station 510. STA 1 608.1 and STA 2 608.2 may be HE stations 104. The master station 610 may be a master station 102 or a HE station 104.

STA 1 608.1 is transmitting a response 622.1 and STA 2 608.2 is transmitting a response 622.2. STA 1 608.1 is transmitting on resource block identification (RBID) 620.33 and STA 1 608.2 is transmitting on RBID 622.3. STA 1 608.1 and STA 2 608.2 may have determined their respective RBIDs 620 based on the neighbor report 318, 400, or 500.

If the neighbor report 318, 400, or 500 included an RBID range STA 1 608.1 and STA 2 608.2 select an RBID from the RBID range. STA 1 608.1 and/or STA 2 608.2 may be associated with the master station 102. In some embodiments, one or both of STA 1 608.1 and STA 2 608.2 may be associated with a neighbor access point of the master station 102 that RBID 620.33 and 622.3 are being transmitted to.

As illustrated the RBIDs 620 are being transmitted on a 20 MHz subchannel with four spatial streams. In some embodiments, multiple subchannels may be used or the subchannel may be smaller or larger.

The columns 616.1, 616.2, 616.3, and 616.4 represent different resource blocks which may be spatial streams that may represent the different codes of the P-matrix, which may be a HE long training field (HE-LTF). The rows 618.1 through 618.9 represent the different resource blocks in the frequency domain. For example, as illustrated, RBIDs may be from 620.1 through 620.36. The rows 618 may be 2 MHz each with 26 data carriers. In some embodiments, the size of the resource blocks 618 may be different. For example, the resource blocks may comprise fewer or more data carriers. The bandwidth of the one or more subchannels may be 2.03125 MHz for 26 data tones and 4.0623 MHz for 52 data tones in accordance with some embodiments. In some embodiments, the number of spatial streams may be different. For example, there may be fewer or more spatial streams for fewer or more columns 616. STA 1 608.1 and STA 2 608.2 may transmit using the RBIDs 620 in accordance with OFDMA.

The receiver 614, which is a master station 102, receives the transmission on RBID 620.33 from STA 1 208.1 and the transmission on RBID 620.3 at the same time. The STAs 608 may transmit simultaneously on the same subchannel. Each RBID 620 may be a 1-bit response mechanism. In some embodiments, the RBIDs 620 indicate that the corresponding STA 608 would like UL resources to transmit packets to the master station 102. For example, the master station 102 may transmit a UL OFDMA resource poll. The STAs 608 may transmit the RBIDs 620 to indicate they would like resources to transmit packets (e.g., association request) to the master station 102.

Figure 7:
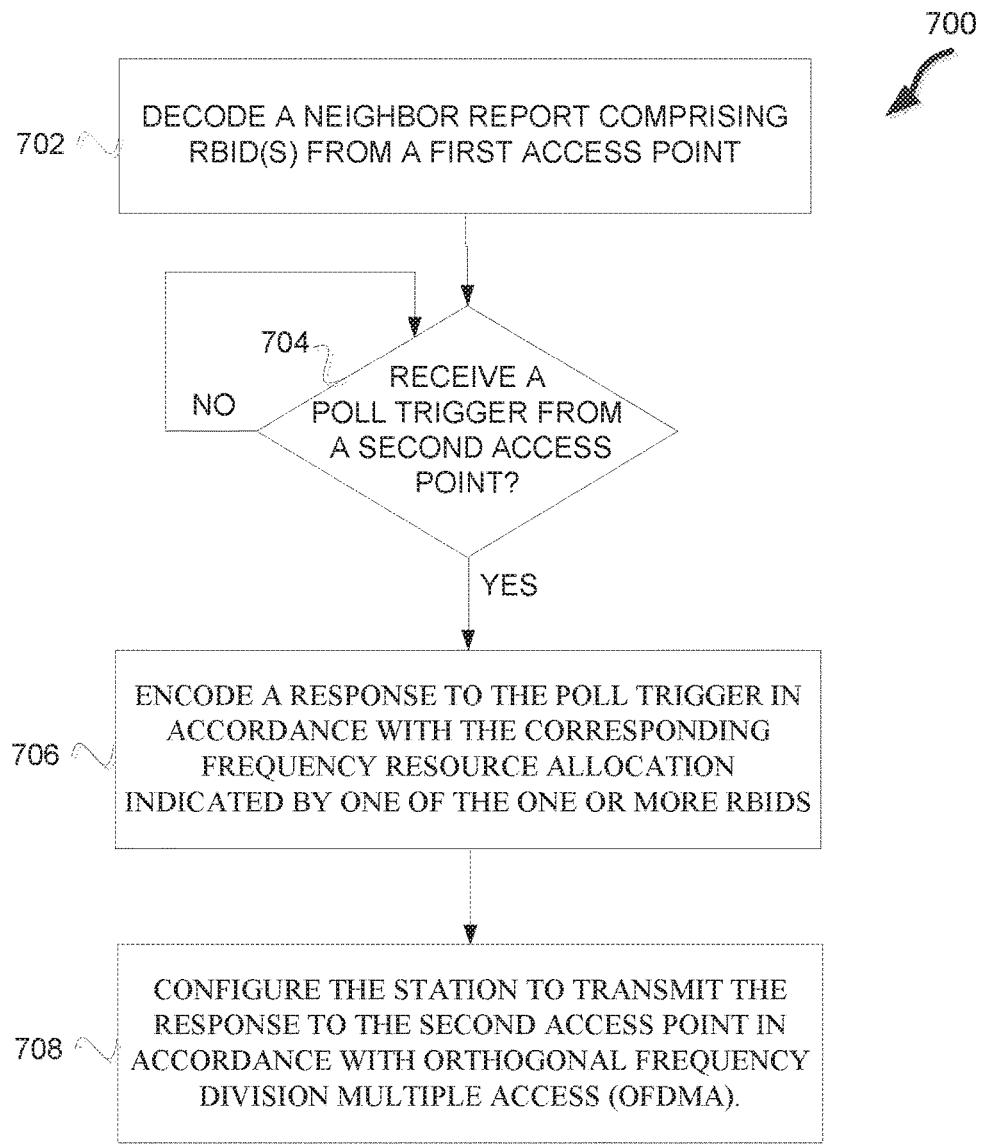
FIG. 7 illustrates a method of RBIDs for neighbor station resource requests in accordance with some embodiments.

FIG. 7 illustrates a method 700 of RBIDs for neighbor station resource requests in accordance with some embodiments. The method 700 begins at operation 702 with decoding a neighbor report comprising RBID(s) from a first access point. For example, referring to FIG. 3, HE station 104.1 may receive neighbor report 318 from master station 102.1.

The method 700 may continue at operation 704 with receiving a poll trigger from a second access point. The station may wait until a poll trigger is received from a second access point and return to operation 704 until the poll trigger is received. The station may time out waiting for the poll trigger (not illustrated) or be interrupted by another event (not illustrated). As an example of operation 704, HE station 104.1 may receive poll trigger 314 from master station 102.3.

The method 700 may continue at operation 706 with encoding a response to the poll trigger in accordance with the corresponding frequency allocation indicated by one of the one or more RBIDs. For example, STA 1 608.1 (FIG. 6) may have been assigned an RBID 620.33 that indicates resource allocation. In some embodiments, the station may be sent a neighbor report that indicates a range of RBIDs and the station may select an RBID and then transmit on the selected RBID.

The method 700 may continue at operation 708 with configure the station to transmit the response to the second access point in accordance with OFDMA. For example, STA 1 608.1 (FIG. 6) may transmit power on the resource allocation indicated by RBID 620.33. In some embodiments, the method 700 may continue with one or more operation where the station receives a resource allocation from the second access point and transmits to the second access point in accordance with the resource allocation. The method 700 may end.

Figure 8:
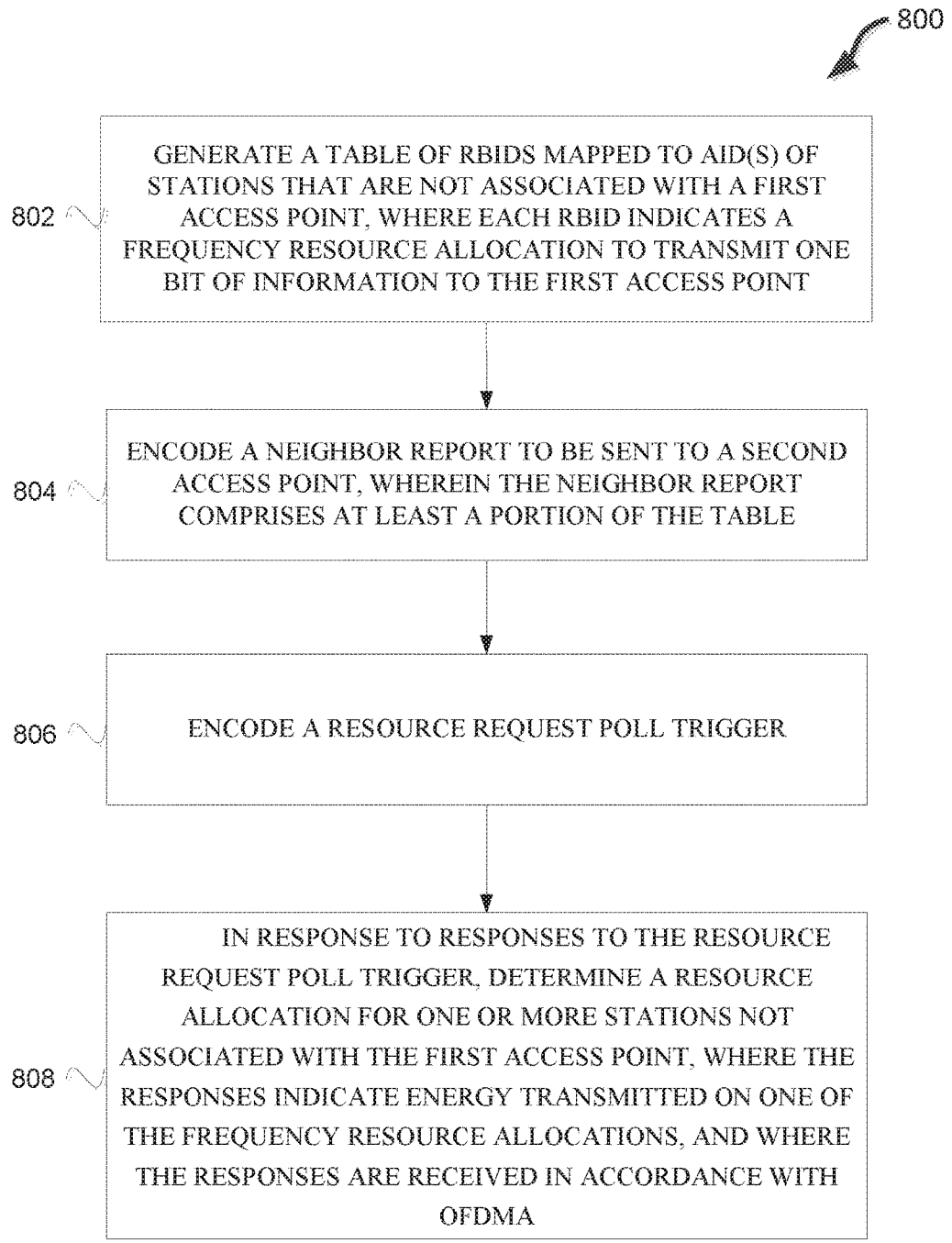
FIG. 8 illustrates a method of RBIDs for neighbor station resource requests in accordance with some embodiments.

FIG. 8 illustrates a method 800 of RBIDs for neighbor station resource requests in accordance with some embodiments. Method 800 may begin at operation 802 with generating a table of RBIDs mapped to AIDs of stations that are not associated with a first access point, wherein each RBID indicates a frequency resource allocation to transmit one bit of information to the first access point. For example, referring to FIG. 3, master station 102.3 may generate RBIDs for neighboring HE stations 316. RBIDs for neighboring HE stations 316 may be directly mapped with one or more RBIDs per AID of non-associated stations, or master station 102.3 may reserve a range of RBIDs for non-associated stations to use to response to poll trigger frames.

The method 800 may continue at operation 804 with encoding a neighbor report to be sent to a second access point, wherein the neighbor report comprises at least a portion of the table. For example, master station 102.3 may send a portion of RBIDs for neighboring HE stations 316 to master station 102.1 either through the backbone 202 or by transmitting.

The method 800 may continue at operation 806 with encoding a resource request poll trigger. For example, master station 102.3 may encode the resource request poll trigger transmitted at 314 (FIG. 3).

The method 800 may continue at operation 808 with in response to responses to the resource request poll trigger, determine a resource allocation for one or more station not associated with the first access point, wherein the responses indicate energy transmitted on one of the frequency resource allocations, and wherein the responses are received in accordance with OFDMA. For example, the master station 102.3 at operation 320 may determine a resource allocation based on responses such as 318. The method 800 may include one or more additional steps such as transmitting the resource allocation to the station, and receiving packets from the station in accordance with the resource allocation. The method 800 may end.

Figure 9:
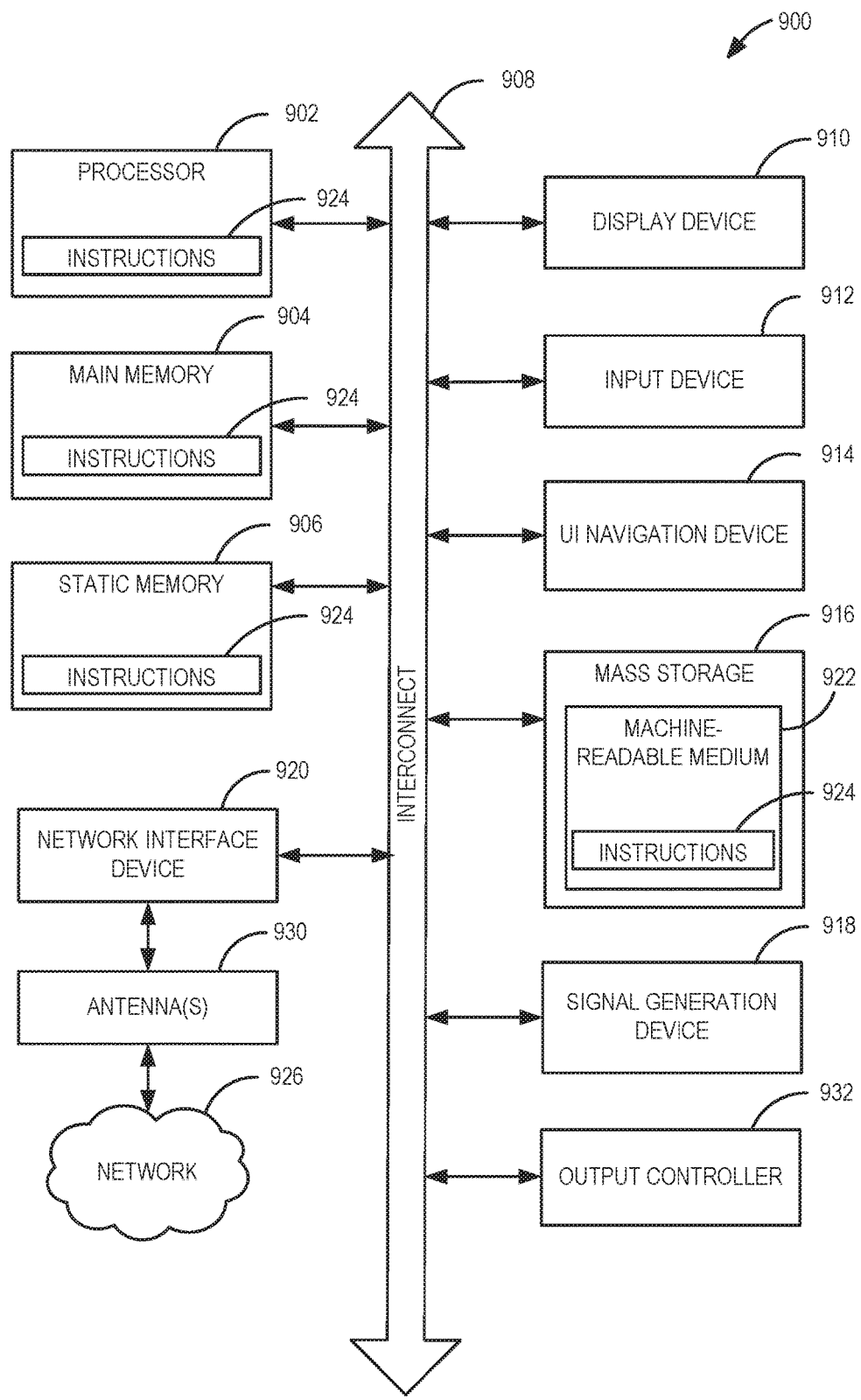
FIG. 9 illustrates a HE device in accordance with some embodiments.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a master station 102, HEW station 104, personal computer (PC), a tablet PC, a set-top box (STB), a personal digital assistant (PDA), a mobile telephone, a smart phone, a web appliance, a network router, switch or bridge, any machine capable of executing instructions (sequential or otherwise) that specify actions to be taken by that machine, or an apparatus that is part of any of the above. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 902 and/or instructions 924 may comprise processing circuitry.

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques. The term "transmission medium" shall be taken to include any intangible medium that is capable of storing, encoding or carrying instructions for execution by the machine 900, and includes digital or analog communications signals or other intangible medium to facilitate communication of such software.

The following examples pertain to further embodiments. Specifics in the examples may be used in one or more embodiments. Example 1 is an apparatus of a station, the apparatus comprising a memory, and processing circuitry coupled to the memory, the processing circuitry configured to: decode a neighbor report comprising one or more resource block identifications (RBIDs) from a first access point, wherein each RBID indicates a frequency resource allocation to transmit one bit of information to a second access point, in response to decoding a poll trigger from the second access point, encode a response to the poll trigger in accordance with the corresponding frequency resource allocation indicated by one of the one or more RBIDs, and configure the station to transmit the response to the second access point in accordance with orthogonal frequency division multiple access (OFDMA). The processing circuitry may be further configured to decode a poll trigger from the second access point.

In Example 2, the subject matter of Example 1 can optionally include where the neighbor report further comprises an indication of a time when the poll trigger is to be transmitted by the second access point, and wherein the processing circuitry is further configured to reduce a power consumption until the time when the poll trigger is to be transmitted.

In Example 3, the subject matter of Examples 1 or 2 can optionally include where each RBID further indicates a spatial stream allocation, and wherein the processing circuitry is further configured to: encode the response in accordance with the spatial stream allocation.

In Example 4, the subject matter of Example 3 can optionally include where the processing circuitry is further configured to configure the station to transmit the response in accordance with OFDMA and multi-user multiply-input multiply-output (MU-MIMO).

In Example 5, the subject matter of Example 3 can optionally include where each frequency resource allocation and spatial stream allocation indicated by the one or more RBIDs are part of a high-efficiency long-training field (HE-LTF).

In Example 6, the subject matter of Example 3 can optionally include where each frequency resource allocation and spatial stream allocation indicated by the one or more RBIDs is one of thirty-six resource blocks per 20 MHz subchannel with 9 frequency resource blocks in a frequency domain by four spatial streams in a spatial domain.

In Example 7, the subject matter of Example 6 can optionally include where reach of the frequency resource allocations is exactly 26 data tones or 52 data tones.

In Example 8, the subject matter of any of Examples 1-7 can optionally include where a receiver address of the poll trigger indicates a broadcast address.

In Example 9, the subject matter of any of Examples 1-8 can optionally include where the frequency resource allocation is part of a high-efficiency long training field (HE-LTF).

In Example 10, the subject matter of any of Examples 1-9 can optionally include where the processing circuitry is further configured to: select one of the one or more RBIDs, wherein the one or more RBIDs are a range of RBIDs for stations not associated with the second access point to use.

In Example 11, the subject matter of any of Examples 1-10 can optionally include where the poll trigger is an uplink (UL) resource request poll trigger, and wherein the processor circuitry is further configured to: decode a packet from the second master station, wherein the packet indicates a resource allocation for the station to transmit to the second access point.

In Example 12, the subject matter of any of Examples 1-11 can optionally include where the station, the first access point, and the second access point are each one from the following group: an access point, an Institute of Electrical and Electronic Engineers (IEEE) 802.11ax access point, an IEEE 802.1 lax station, and a station, and wherein the first access point and the second access point are both part of a same extended service set.

In Example 13, the subject matter of any of Examples 1-12 can optionally include further comprising one or more antennas coupled to the processing circuitry.

In Example 14, the subject matter of any of Examples 1-13 can optionally include further comprising transceiver circuitry couple to the one or more antennas.

Example 15 is a non-transitory computer-readable storage medium that stores instructions for execution by one or more processors. The instructions to configure the one or more processors to cause a station to: decode a neighbor report comprising one or more resource block identifications (RBIDs) from a first access point, where each RBID indicates a frequency resource allocation to transmit one bit of information to a second access point, decode a poll trigger from the second access point, in response to decoding a poll trigger from the second access point, encode a response to the poll trigger in accordance with the corresponding frequency resource allocation indicated by one of the one or more RBIDs, and configure the station to transmit the response in accordance orthogonal frequency division multiple access (OFDMA).

In Example 16, the subject matter of Examples 15 can optionally include where each RBID further indicates a spatial stream allocation, and wherein the processing circuitry is further configured to: encode the response in accordance with the spatial stream allocation.

In Example 17, the subject matter of Examples 15 or 16 can optionally include where each RBID further indicates a spatial stream allocation, and wherein the processing circuitry is further configured to: encode the response in accordance with the spatial stream allocation.

In Example 18, the subject matter of Example 17 can optionally include where the instructions further configure the one or more processors to cause the station to: transmit the response in accordance with OFDMA and multi-user multiply-input multiply-output (MU-MIMO).

In Example 19, the subject matter of any of Examples 15-18 can optionally include where the instructions further configure the one or more processors to cause a the station to: select one of the one or more RBIDs, wherein the one or more RBIDs are a range of RBIDs for stations not associated with the second access point to use.

Example 20 is a method performed by a station, the method comprising: decoding a neighbor report comprising one or more resource block identifications (RBIDs) from a first access point, wherein each RBID indicates a frequency resource allocation to transmit one bit of information to a second access point, decoding a poll trigger from the second access point, in response to decoding a poll trigger from the second access point, encoding a response to the poll trigger in accordance with the corresponding frequency resource allocation indicated by one of the one or more RBIDs, and configuring the station to transmit the response in accordance orthogonal frequency division multiple access (OFDMA).

In Example 21, the subject matter of Example 20 can optionally include selecting one of the one or more RBIDs, wherein the one or more RBIDs are a range of RBIDs for stations not associated with the second access point to use.

Example 22 is an apparatus of a first access point. The apparatus comprising a memory, and processing circuitry coupled to the memory, the processing circuitry configured to: generate a table of one or more resource block identifications (RBIDs) mapped to one or more association identification (AIDs) of stations that are not associated with the first access point, wherein each RBID indicates a frequency resource allocation to transmit one bit of information to the first access point, encode a neighbor report to be sent to a second access point, wherein the neighbor report comprises at least a portion of the table, encode a resource request poll trigger, and in response to responses to the resource request poll trigger, determine a resource allocation for one or more stations not associated with the first access point, where the responses indicate energy transmitted on one of the frequency resource allocations, and where the responses are received in accordance with orthogonal frequency division multiple access (OFDMA).

In Example 23, the subject matter of Examples 22 can optionally include where the processing circuitry is further configured to: configure the first access point to transmit the resource request poll trigger.

In Example 24, the subject matter of Examples 22 or 23 can optionally include where each RBID further indicates a spatial stream allocation, and where the processing circuitry is further configured to: generate the table, where each RBID indicates a frequency resource allocation and spatial stream to transmit one bit of information to the first access point.

In Example 25, the subject matter of any of Examples 22-24 can optionally include further comprising one or more antennas coupled to the processing circuitry.

Example 26 is an apparatus of a station, the apparatus comprising: means for decoding a neighbor report comprising one or more resource block identifications (RBIDs) from a first access point, wherein each RBID indicates a frequency resource allocation to transmit one bit of information to a second access point, in response to decoding a poll trigger from the second access point, means for decoding a poll trigger from the second access point, means for encoding a response to the poll trigger in accordance with the corresponding frequency resource allocation indicated by one of the one or more RBIDs, and means for configuring the station to transmit the response to the second access point in accordance with orthogonal frequency division multiple access (OFDMA).

In Example 27, the subject matter of Example 26 can optionally include where the neighbor report further comprises an indication of a time when the poll trigger is to be transmitted by the second access point, and where the processing circuitry is further configured to reduce a power consumption until the time when the poll trigger is to be transmitted.

In Example 28, the subject matter of Examples 26 or 27 can optionally include where each RBID further indicates a spatial stream allocation, and wherein the processing circuitry is further configured to: encode the response in accordance with the spatial stream allocation.

In Example 29, the subject matter of Example 28 can optionally include where the processing circuitry is further configured to configure the station to transmit the response in accordance with OFDMA and multi-user multiply-input multiply-output (MU-MIMO).

In Example 30, the subject matter of Example 28 can optionally include where each frequency resource allocation and spatial stream allocation indicated by the one or more RBIDs are part of a high-efficiency long-training field (HE-LTF).

In Example 31, the subject matter of Example 28 can optionally include where each frequency resource allocation and spatial stream allocation indicated by the one or more RBIDs is one of thirty-six resource blocks per 20 MHz subchannel with 9 frequency resource blocks in a frequency domain by four spatial streams in a spatial domain.

In Example 32, the subject matter of Example 31 can optionally include where reach of the frequency resource allocations is exactly 26 data tones or 52 data tones.

In Example 33, the subject matter of any of Examples 26-32 can optionally include where a receiver address of the poll trigger indicates a broadcast address.

In Example 34, the subject matter of any of Examples 26-33 can optionally include where the frequency resource allocation is part of a high-efficiency long training field (HE-LTF).

In Example 35, the subject matter of any of Examples 26-34 can optionally include further comprising: means for selecting one of the one or more RBIDs, wherein the one or more RBIDs are a range of RBIDs for stations not associated with the second access point to use.

In Example 36, the subject matter of any of Examples 26-35 can optionally include where the poll trigger is an uplink (UL) resource request poll trigger, and further comprising: means for decoding a packet from the second master station, wherein the packet indicates a resource allocation for the station to transmit to the second access point.

In Example 37, the subject matter of any of Examples 26-36 can optionally include where the station, the first access point, and the second access point are each one from the following group: an access point, an Institute of Electrical and Electronic Engineers (IEEE) 802.1 lax access point, an IEEE 802.11ax station, and a station, and wherein the first access point and the second access point are both part of a same extended service set.

In Example 38, the subject matter of any of Examples 26-37 can optionally include further comprising means for transmitting and receiving radio signals.

In Example 39, the subject matter of any of Examples 26-38 can optionally include further comprising means for processing radio signals.

Example 40 is a non-transitory computer-readable storage medium that stores instructions for execution by one or more processors. The instructions to configure the one or more processors to cause a first access point to: generate a table of one or more resource block identifications (RBIDs) mapped to one or more association identification (AIDs) of stations that are not associated with the first access point, where each RBID indicates a frequency resource allocation to transmit one bit of information to the first access point, encode a neighbor report to be sent to a second access point, where the neighbor report comprises at least a portion of the table, encode a resource request poll trigger, and in response to responses to the resource request poll trigger, determine a resource allocation for one or more stations not associated with the first access point, where the responses indicate energy transmitted on one of the frequency resource allocations, and where the responses are received in accordance with orthogonal frequency division multiple access (OFDMA).

In Example 41, the subject matter of Example 40 can optionally include where the instructions further configure the one or more processors to cause the first access point to: configure the first access point to transmit the resource request poll trigger.

In Example 42, the subject matter of Examples 40 or 41 can optionally include where each RBID further indicates a spatial stream allocation, and wherein the instructions further configure the one or more processors to cause first access point to: generate the table, wherein each RBID indicates a frequency resource allocation and spatial stream to transmit one bit of information to the first access point.

Example 43 is a method performed by a first access point. The method comprising: generating a table of one or more resource block identifications (RBIDs) mapped to one or more association identification (AIDs) of stations that are not associated with the first access point, wherein each RBID indicates a frequency resource allocation to transmit one bit of information to the first access point, encoding a neighbor report to be sent to a second access point, wherein the neighbor report comprises at least a portion of the table, encoding a resource request poll trigger, and in response to responses to the resource request poll trigger, determining a resource allocation for one or more stations not associated with the first access point, where the responses indicate energy transmitted on one of the frequency resource allocations, and where the responses are received in accordance with orthogonal frequency division multiple access (OFDMA).

In Example 44, the subject matter of Example 43 can optionally include configuring the first access point to transmit the resource request poll trigger.

In Example 45, the subject matter of Examples 43 or 44 can optionally include where each RBID further indicates a spatial stream allocation, and where the instructions further configure the one or more processors to cause a the station to: generate the table, where each RBID indicates a frequency resource allocation and spatial stream to transmit one bit of information to the first access point.

Example 46 is an apparatus of a first access point. The apparatus including means for generating a table of one or more resource block identifications (RBIDs) mapped to one or more association identification (AIDs) of stations that are not associated with the first access point, wherein each RBID indicates a frequency resource allocation to transmit one bit of information to the first access point, means for encoding a neighbor report to be sent to a second access point, where the neighbor report comprises at least a portion of the table, means for encoding a resource request poll trigger, and in response to responses to the resource request poll trigger, means for determining a resource allocation for one or more stations not associated with the first access point, where the responses indicate energy transmitted on one of the frequency resource allocations, and wherein the responses are received in accordance with orthogonal frequency division multiple access (OFDMA).

In Example 47, the subject matter of Example 46 can optionally include further comprising: means for configuring the first access point to transmit the resource request poll trigger.

In Example 48, the subject matter of Examples 46 or 47 can optionally include where each RBID further indicates a spatial stream allocation, and wherein the instructions further configure the one or more processors to cause a the station to: generate the table, wherein each RBID indicates a frequency resource allocation and spatial stream to transmit one bit of information to the first access point.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station, the apparatus comprising a memory, and processing circuitry coupled to the memory, the processing circuitry configured to:
   decode a neighbor report comprising one or more resource block identifications (RBIDs) from a first access point, wherein each RBID indicates a frequency resource allocation to transmit one bit of information to a second access point;
   decode a poll trigger from the second access point;
   in response to decoding the poll trigger from the second access point, encode a response to the poll trigger in accordance with the corresponding frequency resource allocation indicated by one of the one or more RBIDs; and
   configure the station to transmit the response to the second access point in accordance with one or both of orthogonal frequency division multiple access (OFDMA) and multi-user multiply-input multiply-output (MU-MIMO).

2. The apparatus of claim 1, wherein the neighbor report further comprises an indication of a time when the poll trigger is to be transmitted by the second access point, and wherein the processing circuitry is further configured to reduce a power consumption until the time when the poll trigger is to be transmitted.

3. The apparatus of claim 1, wherein each RBID further indicates a spatial stream allocation, and wherein the processing circuitry is further configured to: encode the response in accordance with the spatial stream allocation.

4. The apparatus of claim 3, wherein the processing circuitry is further configured to configure the station to transmit the response in accordance with OFDMA and MU-MIMO.

5. The apparatus of claim 3, wherein each frequency resource allocation and spatial stream allocation indicated by the one or more RBIDs are part of a "802.11ax" high-efficiency long-training field (HE-LTF).

6. The apparatus of claim 3, wherein each frequency resource allocation and spatial stream allocation indicated by the one or more RBIDs is one of thirty-six resource blocks per 20 MHz subchannel with 9 frequency resource blocks in a frequency domain by four spatial streams in a spatial domain.

7. The apparatus of claim 6, wherein reach of the frequency resource allocations is exactly 26 data tones or 52 data tones.

8. The apparatus of claim 1, wherein a receiver address of the poll trigger indicates a broadcast address.

9. The apparatus of claim 1, wherein the frequency resource allocation is part of a high-efficiency long training field (HE-LTF).

10. The apparatus of claim 1, wherein the processing circuitry is further configured to:
    select one of the one or more RBIDs, wherein the one or more RBIDs are a range of RBIDs for stations not associated with the second access point to use.

11. The apparatus of claim 1, wherein the poll trigger is an uplink resource request poll trigger, and wherein the processor circuitry is further configured to:
    decode a packet from the second access point wherein the packet indicates a resource allocation for the station to transmit to the second access point.

12. The apparatus of claim 1, wherein the station, the first access point, and the second access point are each one from the following group: an access point, an Institute of Electrical and Electronic Engineers (IEEE) 802.11ax access point, an IEEE 802.11ax station, and a station, and wherein the first access point and the second access point are both part of a same extended service set.

13. The apparatus of claim 1, further comprising transceiver circuitry coupled to the memory.

14. The apparatus of claim 1, further comprising one or more antennas coupled to the transceiver circuitry.

15. A non-transitory computer-readable storage medium that stores instructions for execution by one or more processors, the instructions to configure the one or more processors to cause a station to:
decode a neighbor report comprising one or more resource block identifications (RBIDs) from a first access point, wherein each RBID indicates a frequency resource allocation to transmit one bit of information to a second access point;
decode a poll trigger from the second access point;
in response to decoding a poll trigger from the second access point, encode a response to the poll trigger in accordance with the corresponding frequency resource allocation indicated by one of the one or more RBIDs; and
configure the station to transmit the response in accordance with one or both of orthogonal frequency division multiple access (OFDMA) or multi-user multiply-input multiply-output (MU-MIMO).

16. The non-transitory computer-readable storage medium of claim 15, wherein each RBID further indicates a spatial stream allocation, and wherein the processing circuitry is further configured to: encode the response in accordance with the spatial stream allocation.

17. The non-transitory computer-readable storage medium of claim 15, wherein each RBID further indicates a spatial stream allocation, and wherein the processing circuitry is further configured to: encode the response in accordance with the spatial stream allocation.

18. The non-transitory computer-readable storage medium of claim 17, wherein the processing circuitry is further configured to configure the station to transmit the response in accordance with OFDMA and MU-MIMO.

19. The non-transitory computer-readable storage medium of claim 15, wherein the instructions further configure the one or more processors to cause a the station to:
select one of the one or more RBIDs, wherein the one or more RBIDs are a range of RBIDs for stations not associated with the second access point to use.

20. A method performed by a station, the method comprising:
decoding a neighbor report comprising one or more resource block identifications (RBIDs) from a first access point, wherein each RBID indicates a frequency resource allocation to transmit one bit of information to a second access point;
decoding a poll trigger from the second access point;
in response to decoding a poll trigger from the second access point, encoding a response to the poll trigger in accordance with the corresponding frequency resource allocation indicated by one of the one or more RBIDs; and
configuring the station to transmit the response in accordance orthogonal frequency division multiple access (OFDMA).

21. The method of claim 20, the method further comprising:
selecting one of the one or more RBIDs, wherein the one or more RBIDs are a range of RBIDs for stations not associated with the second access point to use.

22. An apparatus of a first access point, the apparatus comprising a memory, and processing circuitry coupled to the memory, the processing circuitry configured to:
generate a table of one or more resource block identifications (RBIDs) mapped to one or more association identification (AIDs) of stations that are not associated with the first access point, wherein each RBID indicates a frequency resource allocation to transmit one bit of information to the first access point;
encode a neighbor report to be sent to a second access point, wherein the neighbor report comprises at least a portion of the table;
encode a resource request poll trigger; and
in response to responses to the resource request poll trigger, determine a resource allocation for one or more stations not associated with the first access point, wherein the responses indicate energy transmitted on one of the frequency resource allocations, and wherein the responses are received in accordance with orthogonal frequency division multiple access (OFDMA).

23. The apparatus of claim 22, wherein the processing circuitry is further configured to:
configure the first access point to transmit the resource request poll trigger.

24. The apparatus of claim 22, wherein each RBID further indicates a spatial stream allocation, and wherein the processing circuitry is further configured to: generate the table, wherein each RBID indicates a frequency resource allocation and spatial stream to transmit one bit of information to the first access point.

25. The apparatus of claim 22, further comprising transceiver circuitry coupled to the memory; and, one or more antennas coupled to the transceiver circuitry.

* * * * *